April 7, 1931.    A. G. HEGGEM    1,799,297
STUFFING BOX
Filed Sept. 12, 1927    2 Sheets-Sheet 1
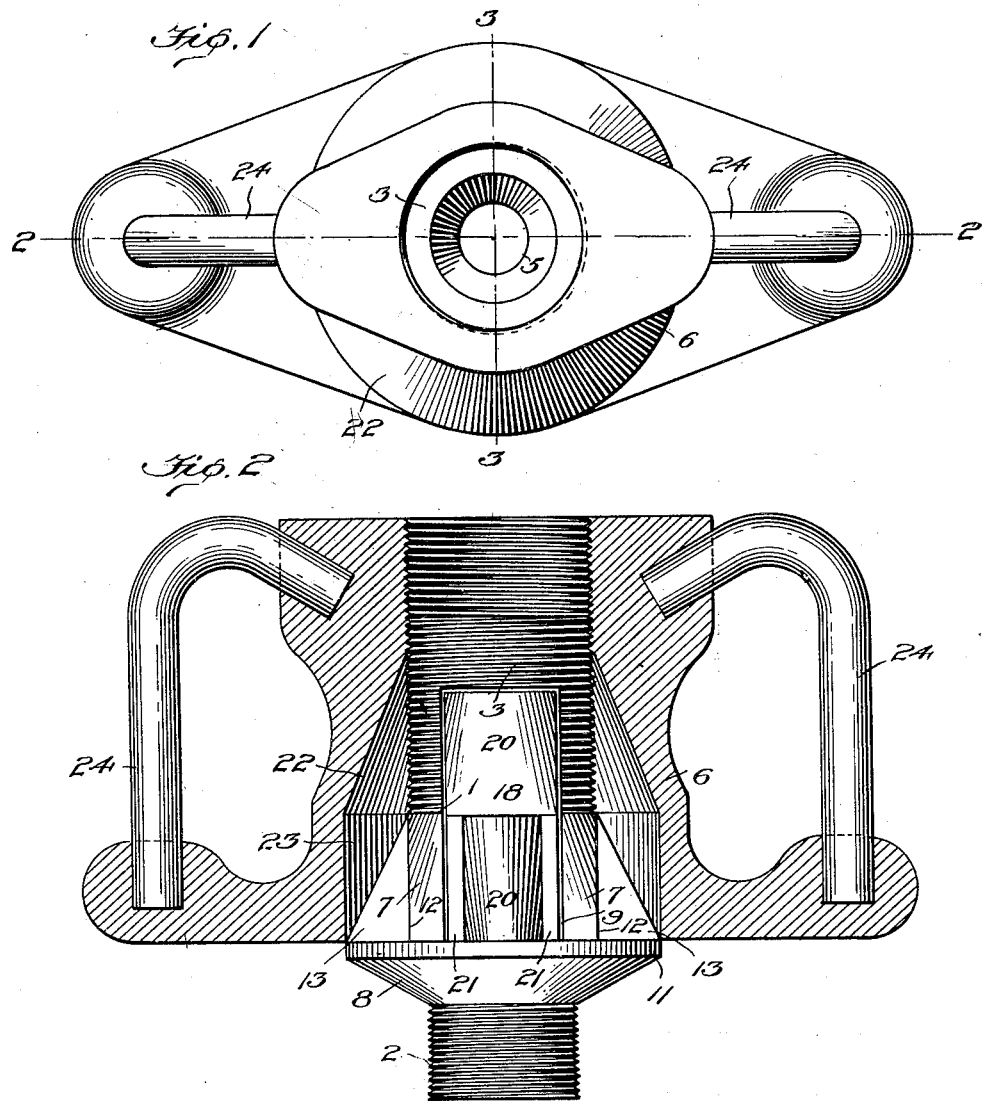
Inventor
Alfred G. Heggem
By
His Attorneys April 7, 1931. A. G. HEGGEM 1,799,297
STUFFING BOX
Filed Sept. 12, 1927 2 Sheets-Sheet 2
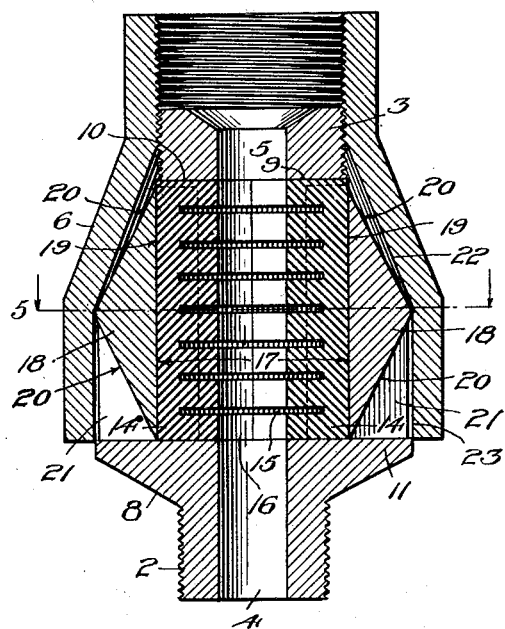
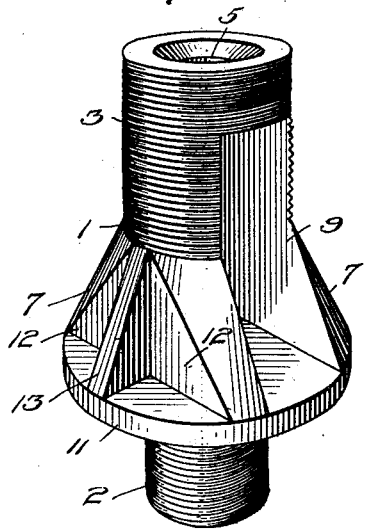
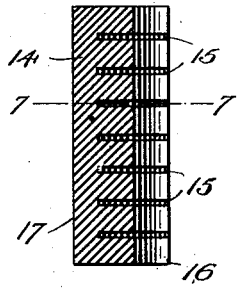
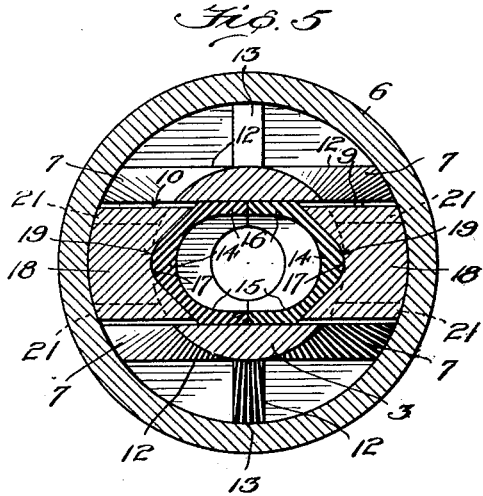
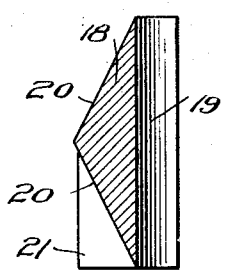
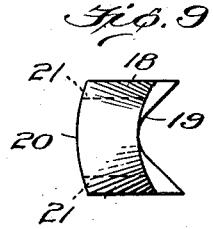
Inventor
Alfred G. Heggem
By
his Attorneys Patented Apr. 7, 1931

1,799,297

UNITED STATES PATENT OFFICE

ALFRED G. HEGGEM, OF TULSA, OKLAHOMA

STUFFING BOX

Application filed September 12, 1927. Serial No. 219,005.

My invention relates to stuffing boxes of the type primarily designed for use in connection with a reciprocating element such as a drilling line or polished rod employed in oil well operations. The principal object of the invention is to provide simple and efficient means whereby packing may be readily adjusted to maintain it in operative engagement with the reciprocating element thus preventing loss of oil or other fluid. Another and important object of the invention is to construct the stuffing box so that means is provided above and below the packing to relieve the latter from the lateral thrusts usually imparted thereto by the reciprocating element, which, due to its actuating mechanism, tends to travel in the arc of a circle.

The principal feature of the invention consists in providing the stuffing box with a member having spaced apertured portions for receiving a reciprocating element and adapted to prevent lateral movement thereof, said member being fashioned to accommodate a plurality of packing units, and in combining therewith means having wedging cooperation with the packing units for forcing them into operative engagement with the reciprocating element.

A further feature of the invention resides in forming a stuffing box with a passageway for a reciprocating element and a plurality of oppositely disposed lateral openings, and in combining therewith, a plurality of packing members respectively mounted in said openings, and means for simultaneously wedging said packing members into operative engagement with the reciprocating element.

Another and more specific feature of the invention consists in providing the stuffing invention with a member fashioned with alined apertures for the passage of a reciprocating element and having lateral openings intermediate said apertures, and in associating therewith a plurality of packing units respectively mounted in said openings, and wedging means for advancing the packing units toward the axis of the alined apertures, said means involving wedge followers engageable with the packing members and a cooperable rotatable housing for actuating said followers.

Other features of the invention relating to advantageous combinations and relations of parts will hereinafter appear and be pointed out in the claims.

In the drawings:

Figure 1 is a plan view of a stuffing box embodying a preferred form of the invention.

Figure 2 is a sectional view on the line 2—2, Fig. 1.

Figure 3 is a sectional view on the line 3—3, Fig. 1.

Figure 4 is a detail perspective view of the central body member.

Figure 5 is a detail sectional view on the line 5—5, Fig. 3.

Figure 6 is a detail sectional view of one of the packing units.

Figure 7 is a sectional view on the line 7—7, Fig. 6.

Figure 8 is a detail sectional view of one of the packing followers.

Figure 9 is a plan view of the follower shown in Fig. 8.

In the drawings 1 indicates the main body member of the stuffing box formed with spaced cylindrical portions 2 and 3 having alined apertures 4 and 5, respectively, for the passage of a reciprocating element, such as a drilling line or polished rod, not shown. Each of these portions, 2 and 3, is preferably exteriorly threaded, the former for connection to an oil well casing or tubing head, coupling or the like, the latter for receiving the adjustably rotatable housing 6. Intermediate the cylindrical portions 2 and 3, the member 1 is formed with substantially frustoconical sections 7 and 8 arranged in inverted relation.

The upper cone sections 7 and a part of the upper cylindrical portion 3 of the member 1 are provided with lateral openings or slots 9 and 10 having a communication with the passageway for the reciprocating element, the openings being preferably disposed on diametrically opposite sides of the axis of the alined apertures 4 and 5. These openings extend from the upper apertured portion 3 downwardly to the complementary bases 11 of the cone frustas. That the member 1 may not be too heavy and cumbersome portions of the upper cone section on opposite sides of the openings 9 and 10 may advantageously be removed, as indicated at 12, sufficient metal being left to form rigidifying ribs or flanges 13.

Removably mounted in each of the lateral openings or slots for cooperating with the reciprocating element to prevent the loss of oil or other fluid is a packing member or unit 14 whose inner surface may be provided with a plurality of grooves 15 for enhancing its flexibility. The side walls 16 of each of the members 14 extend parallel to and contact with the respective side walls of the openings 9 and 10.

The packing units are fashioned with curved outer surfaces 17 to cooperate with the followers 18 whose inner surfaces 19 are correspondingly curved to insure practically uniform application to the packing units of pressure transmitted thereto from the followers. Each of the followers is substantially triangular in section, as clearly shown in Figure 8, and their outer surfaces 20 are conically shaped. Extending laterally from opposite edges of the lower inverted conical surface of the followers 18 are a plurality of legs or flanges 21 for supporting the latter in an upright position and adapted to have sliding engagement with the respective bottom walls of the openings 9 and 10.

The interior of the housing 6 which is threaded at its upper end for cooperation with the upper cylindrical portion 3 of the member 1 has an intermediate conical surface 22 adapted to have wedging engagement with the followers 18 for simultaneously moving them inwardly to force the packing units into operative engagement with the reciprocating element. This conical surface is of slightly greater inclination than that of the cooperating surfaces of the wedge followers so that the latter contact therewith only at points lying in a single plane or line, thereby insuring that the adjusting pressure may be applied at the point best suited for the conditions encountered. In the present illustration the pressure is applied substantially centrally of the followers, but variations in the resiliency or toughness of the rubber packing may make it desirable to apply the pressure considerably below the centers of the followers. As the bottom wall of each of the openings 9 and 10 are disposed in a substantially horizontal plane, the followers and packing units which are supported thereon are caused to move in a direction normal to the axis of the alined apertures.

The interior of the lower end of the housing 6 is cylindrical, as indicated at 23, and, being concentric with and of slightly greater diameter than the annular portion 11 of the member 1, moves downwardly over the latter when the housing is rotated to wedge the packing units into their operative positions. Handles 24 may advantageously be secured to the housing, thus affording convenient means for rotating it in the desired direction.

Notwithstanding a lateral movement may be imparted to the reciprocating element by its actuating mechanism, it will be observed, that the alined apertured portions 2 and 3 of the member 1 constitute effective means for guiding the reciprocating part in a substantially straight line, whereby the packing units which are interposed between the said apertured portions are not subjected to lateral thrusts.

It will be appreciated that by this construction the packing units may be readily removed and replaced, and means are provided wherein the mechanical advantage of a wedging action is most effectively utilized for actuating the packing units.

I claim:

1. A stuffing box involving a member having spaced apertured guide portions for receiving a reciprocating element and preventing lateral movement thereof, said member being fashioned to accommodate packing means, and means embracing and movable with respect to said member having wedging cooperation with the packing means for forcing the latter into operative engagement with the reciprocating element.

2. A stuffing box involving a member provided with spaced integrally connected portions having apertures for the passage of a reciprocating element, said member being formed intermediate said portions with openings for receiving a plurality of packing members, and means for simultaneously wedging each of the packing members into operative engagement with the reciprocating element, said means including a common operating means engaging and encircling said member.

3. A stuffing box involving a member provided with a passsageway for a reciprocating element and having a plurality of openings communicating with the passageway, a plurality of packing members respectively mounted in said openings, and wedging means cooperable with said packing members for forcing them into operative engagement with the reciprocating element, said means involving a plurality of engaging wedge members one of which is mounted on said first-named member and movable with respect thereto in the direction of length of said passageway.

4. The combination with a stuffing box provided with a passageway for a reciprocating element and having a plurality of oppositely disposed lateral openings, of a plurality of packing members respectively mounted in said openings, and means for simultaneously wedging said packing members into operative engagement with the reciprocating element, said means including a plurality of relatively movable followers of wedge form and a movable wedge member engaging each of said followers to actuate the latter.

5. The combination with a stuffing box provided with alined apertures for the passage of a recprocating element and having a plurality of lateral openings, of a plurality of packing members respectively mounted in said openings substantially parallel to the axis of the alined apertures, and wedging means cooperable with the packing members for forcing them into operative engagement with the reciprocating element, said means comprising a plurality of followers of wedge form and a rotatable member encircling said followers and having wedging engagement therewith.

6. A stuffing box involving a member having spaced apertured portions for the passage of a reciprocating element, a plurality of packing units carried by said member intermediate its apertured portions and means encircling one of said portions for adjustably wedging the packing units into operative engagement with the reciprocating element.

7. The combination with a stuffing box provided with an inner member having spaced apertured portions for the passage of a reciprocating element, and having openings intermediate said portions for receiving packing units, one of said portions being exteriorly threaded, of a plurality of packing units extending into said openings and carried by the inner member intermediate said spaced portions, and an outer member engageable with the threaded portion of said inner member and cooperable with the packing units for wedging them into operative engagement with the reciprocating element.

8. A stuffing box involving a member having spaced alined apertures for the passage of a reciprocating element, said member being provided with a plurality of lateral openings extending outwardly through the walls of said member intermediate said alined apertures, a plurality of packing units respectively mounted in said openings, and wedging means cooperable with said packing units for forcing them simultaneously into operative engagement with the reciprocating element, said wedging means involving a wedge member which is rotatable around an axis passing through said alined apertures.

9. The combination with a stuffing box having a passageway for a reciprocating element and a plurality of openings communicating therewith, of a plurality of packing units respectively mounted in said openings, and a rotatable housing cooperable with said packing units for wedging them into operative engagement with the reciprocating element.

10. A stuffing box involving a member provided with alined apertures for the passage of a reciprocating element and having lateral openings intermediate said apertures, a plurality of packing units respectively mounted in said openings, and wedging means for advancing the packing units toward the axis of the alined apertures, said means involving wedge followers engageable with said packing members and a cooperating rotatable housing for actuating said followers.

11. The combination with a stuffing box having a passageway for a reciprocating element, of a plurality of packing units, and means for forcing the latter into operative engagement with the reciprocating element, said means involving wedge followers respectively engageable with the packing units, and a rotatable housing for actuating the followers, the member and followers having cooperating angularly disposed inclined surfaces.

12. A stuffing box involving a member provided with alined apertures for the passage of a reciprocating element and having a plurality of lateral openings, packing units respectively disposed in said openings, and wedging means for advancing the packing units toward the axis of the alined apertures, said means involving wedge followers engageable with said packing units and a cooperating rotatable housing for actuating said followers, the latter being supported by said apertured member and adapted to move radially in a direction normal to the said axis.

13. A stuffing box involving a member provided with a passageway for a reciprocating element and having an annular portion substantially normal to the axis of the passageway, of a plurality of packing units carried by said portion, and wedging means for forcing the packing units into operative engagement with the reciprocating element, said means involving a plurality of followers respectively engagable with the packing units and a cooperable rotatable housing having a conical interior surface for actuating said followers, the said conical surface terminating in a substantially cylindrical surface concentric with the annular portion of the said member.

14. The combination with a stuffing box having alined openings for the passage of a reciprocating element, of a plurality of packing units, wedge followers respectively engageable with the latter, and means for actuating the wedge followers for forcing the packing units into operative engagement with the reciprocating element, each of said followers being fashioned with laterally extending legs so as to cause them upon being actuated by said means to move in a direction normal to the axis of the alined openings.

In testimony whereof I affix my signature.

ALFRED G. HEGGEM.